Figure 1:
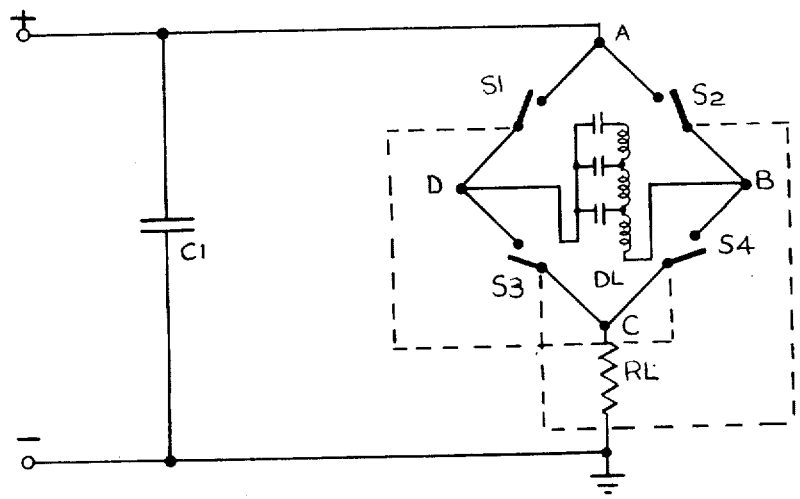

Oct. 29, 1957   J. M. DODDS   2,811,654
ELECTRICAL PULSE GENERATORS
Filed Aug. 26, 1955   2 Sheets-Sheet 1

INVENTOR
John Mathieson Dodds
By Morris & Ottesen
ATTORNEYS

Oct. 29, 1957  J. M. DODDS  2,811,654
ELECTRICAL PULSE GENERATORS
Filed Aug. 26, 1955  2 Sheets-Sheet 2

INVENTOR
John Mathieson Dodds
By Mario L. Patterson
ATTORNEYS

United States Patent Office 2,811,654
Patented Oct. 29, 1957

2,811,654

ELECTRICAL PULSE GENERATORS

John Mathieson Dodds, Timperley, England, assignor to Metropolitan-Vickers Electrical Company Limited, London, England, a British company Application August 26, 1955, Serial No. 530,768

Claims priority, application Great Britain October 19, 1956

4 Claims. (Cl. 307—108)

This invention relates to electrical pulse generators and more particularly to pulse generators of the kind in which a pulse forming network, is first charged and is then discharged to generate a pulse. With such arrangements the charging of pulse forming networks is normally effected through an inductance and a rectifier and discharging through an electronic switch such as an ignitron. Whilst such an arrangement works well there is a limit to the maximum power output and to the pulse recurrence frequency imposed by the de-ionisation characteristics of the electronic switch by which the network is discharged through the load circuit to generate the pulse, and if the power output and/or recurrence frequency are increased too much there is a risk that the circuit may frequently trip out since if re-charging commences before the electronic switch has had time to de-ionise the supply source will be short-circuited through the inductance, rectifier and switch.

The main object of the invention is to provide an improved arrangement in which these difficulties are substantially avoided.

According to the present invention an electrical pulse generating arrangement comprises a pulse forming network, a load circuit, a reservoir circuit having a capacitance large relative to that of the pulse forming network and adapted for connection to a D. C. charging source together with reversing switching means whereby the pulse forming network may be connected in series with the load circuit and the reservoir capacitance alternately in opposite directions, whereby at each switching reversal the pulse forming network is re-charged from the reservoir circuit, whereby the current flow through the load circuit generates a pulse and the current flows in the same direction through the load circuit each time a pulse is generated.

The term "pulse forming network" implies inter alia that there is no D. C. path through the network.

According to a preferred arrangement the reversing switches are arranged in the respective arms of a bridge circuit, the switches in opposite arms being ganged and the pulse forming network is connected across one pair of opposite junction points of the bridge circuit and the reservoir capacitance and load circuit across the other pair of junction points and means are provided for alternately closing the two pairs of switches so that the direction of connection of the pulse forming network relative to the reservoir circuit and load circuit is reversed during each alternate switch actuation.

In order that the invention may be more clearly understood reference will now be made to the accompanying drawings, in which:

Figs. 1, 2, 3 and 4 respectively show two examples of apparatus embodying the invention.

In Fig. 1 the condenser C1 constitutes the reservoir circuit above referred to and this is charged from + and − D. C. supply terminals. Switches S1, S2, S3 and S4 are arranged in the respective arms of a bridge network as shown in the drawing, a pulse forming network shown as an open-ended delay line DL is connected across the opposite junction points B and D and the external circuit is connected across the other pair of junction points, i. e. A and C.

It will be appreciated that if S1 and S4 are closed then the network DL will be charged so that the left hand side is positive and the right hand side negative. If now S1 and S4 are opened and S2 and S3 are closed the network DL will be connected in series with C1 and RL but with a reversed polarity so that it will be rapidly re-charged from C1 and the flow of current through RL will generate a pulse. Clearly, if S2 and S3 are now opened and S1 and S4 are again closed another pulse will be generated and by alternately operating the two pairs of switches in this manner recurrent pulses may be generated, it being appreciated that the direction of current flow through RL is always the same.

Figure 2:
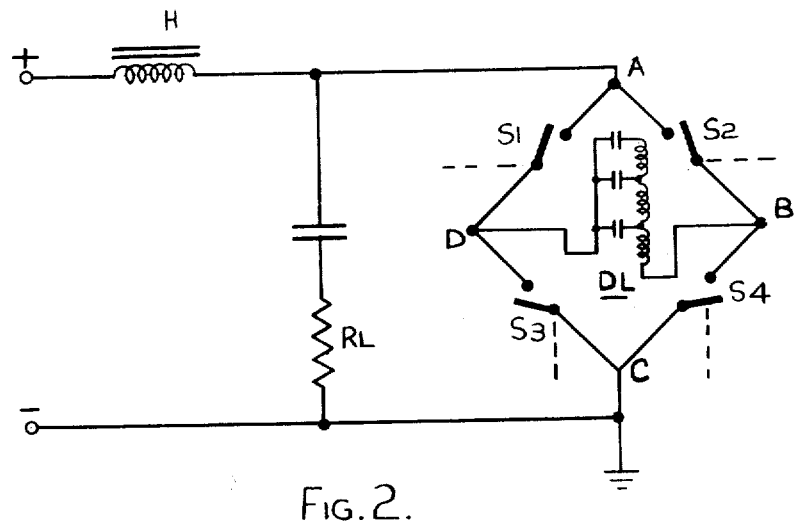

Fig. 2 shows an alternative arrangement in which RL is arranged in series with C1 across the supply instead of in series with the bridge circuit as shown in Fig. 1. It will be appreciated that the operation of Fig. 2 is exactly the same as that of Fig. 1. An isolating choke H must be provided in this case.

Figure 3:
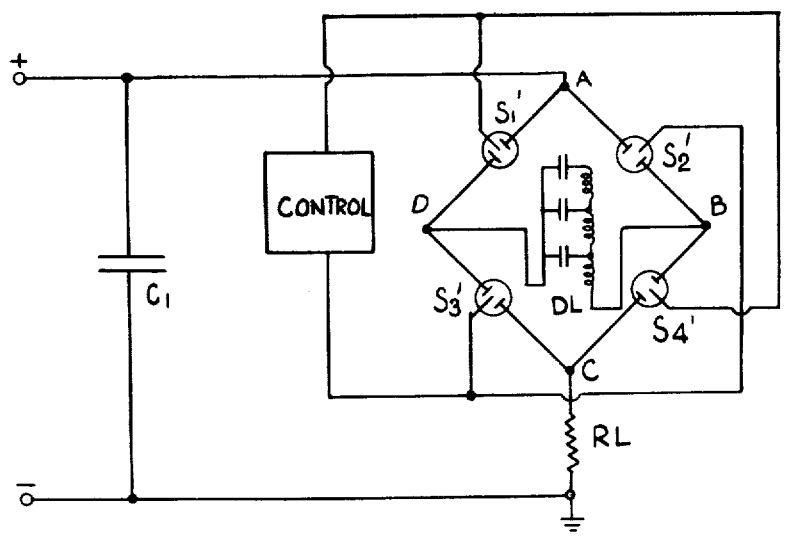
Figure 4:
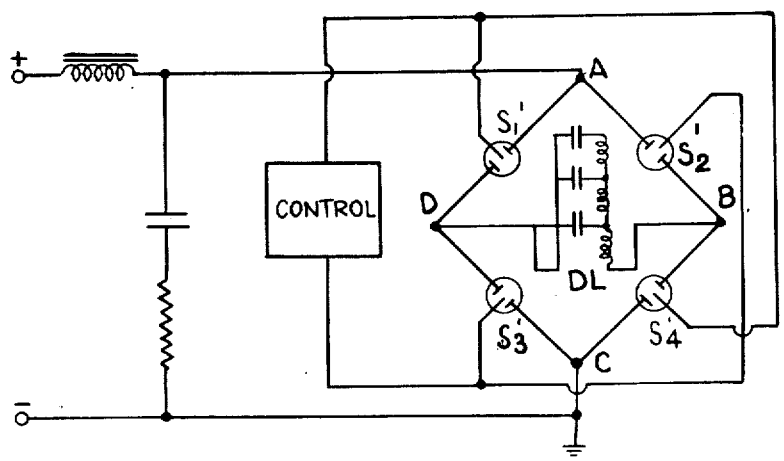

In order to simplify the description it has been assumed that S1, S2, S3 and S4 are switches which are closed and opened as described. In practice they would normally be discharge devices S1′–S4′ such as thyratrons or spark gaps, e. g. rotary spark gaps, which would deionise after each period of conduction and Figs. 3 and 4 show how such devices would be connected in the arrangements of Figs. 1 and 2 respectively and triggered from a control circuit.

It will be appreciated that such an arrangement has the advantage that there is normally no D. C. path across the supply, and there are always two switches in series, thus minimising the risk of random firing through. Moreover, each pair of opposite switches is used only on alternate pulses and not on every pulse, thus giving the maximum possible time for deionisation in the case of discharge tubes.

A high recurrence frequency can hence be obtained. The generation of pulses automatically charges the delay line in readiness for the next pulse so that there is no need to provide charging time for the delay line. Moreover, a charging diode is unnecessary and in the case of Fig. 1 arrangement the isolating choke can also be dispensed with.

What I claim as new and desire to secure by Letters Patent of the United States is:

1. Electrical pulse generating apparatus comprising a bridge network, arms to said network and junction points between adjacent arms, switching means located on each of said arms, a pulse forming network connected between a pair of opposite junction points, a load circuit and a reservoir capacitance connected in series with said load circuit across the alternate pair of bridge junction points, a source of direct voltage connected across the reservoir capacitance and means for actuating said switching means so as to connect the pulse forming network recurrently across the reservoir capacitance alternately in opposite directions so as to generate unidirectional pulses.

2. Electrical pulse generating apparatus comprising a bridge network, arms to said network and junction points between adjacent arms, switching means located on each of said arms, a pulse forming network connected between a pair of opposite junction points, a load circuit and a reservoir capacitance connected in series with said load circuit across the alternate pair of bridge junction points, a source of direct voltage connected across the reservoir capacitance and control means for actuating the switching means in an opposite pair of bridge arms alternately to the closed and open positions whilst actuating the switching means in the alternate arms to the respective opposite positions so as to connect the pulse forming network recurrently across the capacitance alternately in opposite directions.

3. Electrical pulse generating apparatus comprising a reservoir capacitance circuit connected across a direct current charging source, a pulse forming network, reversing switching means for connecting said pulse forming network to said reservoir circuit and charging source for charging recurrently and alternately in opposite directions, and a load circuit connected between the switching means and the reservoir circuit.

4. Electrical pulse generating apparatus comprising a reservoir capacitance circuit connected across a direct current charging source, a pulse forming network, reversing electronic switching means for connecting said pulse forming network to said reservoir circuit and charging source for charging recurrently and alternately in opposite directions, and a load circuit connected between the switching means and the reservoir circuit.

References Cited in the file of this patent

UNITED STATES PATENTS

| | | |
|---|---|---|
| 2,415,116 | Stiefel | Feb. 4, 1947 |
| 2,585,817 | Michaelis | Feb. 12, 1952 |

UNITED STATES PATENT OFFICE

CERTIFICATE OF CORRECTION

Patent No. 2,811,654                              October 29, 1957

John Mathieson Dodds

It is hereby certified that error appears in the above numbered patent requiring correction and that the said Letters Patent should read as corrected below.

In the heading to the printed specification, line 8, date of priority, for "October 19, 1956" read -- September 7, 1954 --.

Signed and sealed this 21st day of January 1958.

(SEAL)
Attest:

KARL H. AXLINE
Attesting Officer

ROBERT C. WATSON
                                                     Commissioner of Patents